(12) United States Patent
Lai (10) Patent No.: US 8,204,368 B2
(45) Date of Patent: Jun. 19, 2012

(54) LENS PORT

(75) Inventor: Yuk Shing Lai, Kowloon (HK)

(73) Assignee: Nauticam International Limited, Fo Tan (HK)

( * ) Notice: Subject to any disclaimer, the term of this patent is extended or adjusted under 35 U.S.C. 154(b) by 0 days.

(21) Appl. No.: 12/629,491

(22) Filed: Dec. 2, 2009

(65) Prior Publication Data

US 2010/0135647 A1 Jun. 3, 2010

Related U.S. Application Data

(60) Provisional application No. 61/119,066, filed on Dec. 2, 2008.

(51) Int. Cl.
*G03B 17/08* (2006.01)
(52) U.S. Cl. .......................................................... 396/25
(58) Field of Classification Search ................ 396/25, 396/27, 29; 348/81
See application file for complete search history.

(56) References Cited

U.S. PATENT DOCUMENTS

| 5,822,622 | A | * | 10/1998 | Inoue | 396/27 |
| 7,426,339 | B2 | * | 9/2008 | Takanashi | 396/27 |
| 2003/0081328 | A1 | | 5/2003 | Nomura et al. | |
| 2004/0263998 | A1 | | 12/2004 | Terada | |
| 2007/0020987 | A1 | * | 1/2007 | Shirako et al. | 439/362 |

FOREIGN PATENT DOCUMENTS

GB 1 328 495 8/1973
JP 08-271780 10/1996

* cited by examiner

*Primary Examiner* — Clayton E Laballe
*Assistant Examiner* — Noam Reisner
(74) *Attorney, Agent, or Firm* — Young & Thompson (57) ABSTRACT

The device includes a lens port (1) for underwater photography attachable in use to housing. The port (1) has a control element which includes a knob (2) operable externally of the port (1) to engage and disengage a ring forming part of a camera lens positioned, in use, within the port (1). The construction will operate even if there is some misalignment between the port (1) and the lens during insertion of the lens into the port (1).

16 Claims, 11 Drawing Sheets

LENS PORT

TECHNICAL FIELD

The invention relates to a Lens Port and particular to a lens port attachable to a housing for underwater cameras.

BACKGROUND ART

Lenses for digital cameras usually have zoom and/or focus systems operated by a rotary mechanism with a rubber ring on its outer peripheral surface. Depending on the type some lenses have two such rubber rings to allow operation of both zoom and focus functions while some lenses have only one. In the case of underwater photography it is necessary to be able to operate the zoom and/or focus functions of the camera, therefore the port which houses the lens must be equipped with a device which allows operation of these functions from a position external of the camera housing.

It is also important that the lens can be easily attached and detached from the lens coupling device of the lends port as removal of the camera and lens from the housing and port is frequently required, for example to change a battery or indeed to change the lens mounted on the camera.

Attempts have been made to meet these requirements by manufacturing a lens port which uses a gear system to transmit rotational force from outside the port to the lens positioned within the port. This type of construction requires the user to mount gear rings onto the outer periphery of the lens before the lens is inserted into the port. In some cases the rubber ring on the lens must be removed prior to mounting the gear ring on the lens. The gear ring must be precisely positioned on the lens so that when the lens is inserted into the port the gear ring on the lens and the gear or cog provided on the inside of the port mesh correctly.

In another construction the gear or cog drives a gear ring mounted on the inside of the port. The gear ring is provided with one or more, usually two, ribs which engage corresponding slots in a ring which the user mounts on the lens prior to insertion of the lens into the port. When inserting the lens into the port care is necessary to ensure the correct engagement between the ribs and slots.

Although the use of gears for torque transmission provides a reliable and efficient method care and attention is necessary when inserting the lens into the port otherwise the lens must be removed from the port and re-inserted. If the problem is not discovered until the camera is underwater the photographer must return to the surface or not use the zoom/focus functions.

U.S. Pat. No. 5,822,622 shows a further alternative in which a ring with a magnet attached is mounted on the lens and the port also has a rotatable ring with a magnet thereon. Rotation of the ring on the port causes the ring on the lens to also rotate. Insertion of the lens into the port is simplified as alignment is less critical but the diameter of the rotatable ring on the port is quite large and rotation of the ring by one hand is awkward.

United States Patent application 2006/0177206 shows yet another approach to solving this problem by providing rollers on the inside of the port which are mounted on a rotatable ring. The rollers engage the rubber ring on the lens to rotate the zoom/focus ring. However, again the large diameter of the external ring makes the construction difficult to operate particularly with one hand.

OBJECT OF THE INVENTION

It is an object of the invention to provide a lens port that ameliorates some of the disadvantages and limitations of the known art or which will at least provide the public with a useful choice.

DISCLOSURE OF INVENTION

In a first aspect the invention consists in a port for underwater photography attachable in use to a housing, the port having a control means operable externally of the port to engage and disengage a ring forming part of a lens positioned, in use, within the port.

Preferably the control means includes a knob having a longitudinal axis, the longitudinal axis of the knob being positioned substantially normal to the longitudinal axis of the port.

Preferably the control means includes clamps, which in use engage a ring forming part of the lens, a first operation of the control means causing the clamp to engage or disengage the lens ring and a second operation of the control means causing the clamp means to rotate the lens ring.

Preferably the control means includes an apertured ring, biased arms mounted on the exterior of the ring, the arms having pads thereon, the pads being extendable through the apertures to engage the lens ring, and a further ring about the arms, the further ring having means thereon to bear on the arms to push the pads through the apertures against the bias, the further ring being caused to rotate about its longitudinal axis by the first operation of the control means.

Preferably the apertured ring and the arms are caused to rotate about the longitudinal axis of the apertured ring by the second operation of the control means.

Preferably in use the connection between the control means and the ring forming part of the lens is floating to allow some misalignment between the lens and the control means.

Preferably the knob includes a first knob part and a second knob part, the first knob part having a floating connection to the further ring, and the first knob part being operable to cause the first operation of the control means.

Preferably the apertured ring has a floating connection to a gear ring, the second knob part being operable to cause the second operation of the control means.

Preferably the second operation occurs when the first and second knob parts are operated together.

In a further aspect the invention consists in a port according to the preceding paragraphs with a camera lens mounted at least partially therein.

In a still further aspect the invention consists in a camera housing and a port in combination, the port being constructed according to any one of the preceding paragraphs.

BRIEF DESCRIPTION OF DRAWINGS

The invention will now be described, by way of example only, by reference to the accompanying drawings in which.

BEST MODE FOR CARRYING OUT THE INVENTION

The following description will describe the invention in relation to preferred embodiments of the invention, namely a lens port. The invention is in no way limited to these preferred embodiments as they are purely to exemplify the invention only and that possible variations and modifications would be readily apparent without departing from the scope of the invention.

Considering FIGS. 1 to 17, FIG. 1 shows a lens port 1 which is engageable in use with a housing for use to contain a camera and lens for underwater photographic use. Any effective manner of attaching the port to the housing may be used. A control means is provided which can engage and disengage a zoom and/or focus ring of a camera lens positioned in use within the port.

The control means includes a knob 2. The knob 2 is made up of an inner knob part 3 and an outer knob part 4. The inner knob part 3 is able to nest in a recess 5 provided in the upper face of the outer knob part 4. The inner knob part 3 is connected to a shaft 7. The outer knob part 4 is connected to an outer part 8 and a tubular member 9 is provided about the outer part 8 and the shaft 7. The connections are such that with the shaft 7 extended from the outer part 8 rotation of the knob part 3 will rotate the shaft 7 but with the knob part 3 nested within the recess 5 then rotation of the knob parts 3 and 4 together will rotate both the shaft 7 and outer part 8. The distal end 10 of outer part 8 carries a cog 11. The distal end 12 of the inner part 7 passes through the distal end 10 of the outer part 8 and through an aperture in the cog 11 to engage a cog 13. The cog 11 meshes with an intermediate cog 15. Cog 15 engages a gear ring 16, whilst cog 13 engages a gear ring 17. Thus when knob part 3 is extended and rotated cog 13 rotates gear ring 17 but when knob part 3 is nested within knob part 4 and the knob parts 3 and 4 are rotated together the cog 13 rotates gear ring 17 and cog 11 rotates cog 15 to thereby rotate gear ring 16. This will be described further in respect of FIGS. 15 to 17.

Figure 1:
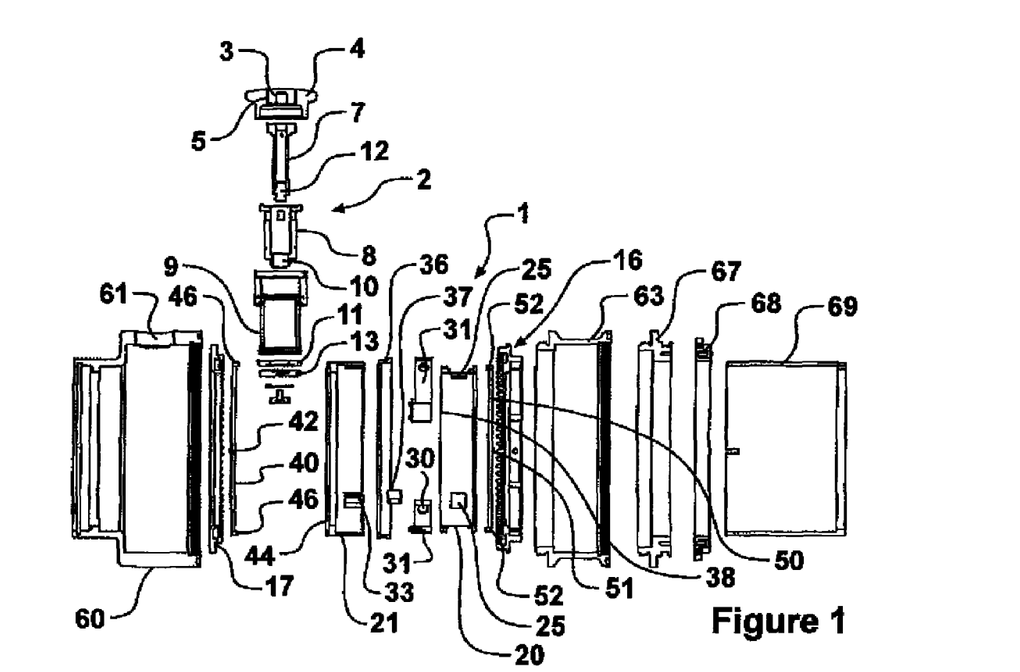
FIG. 1 is an exploded view of a lens port in accordance with the preferred embodiment of the invention.
Figure 2:
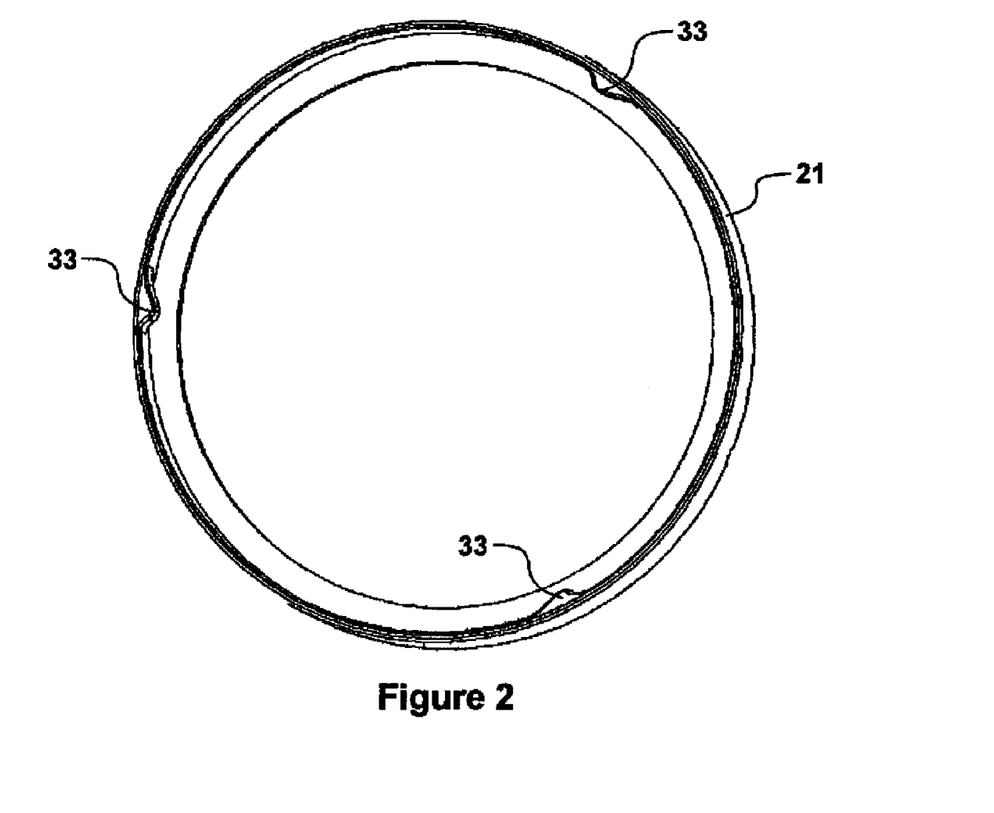
FIG. 2 is a perspective view of a ring forming part of a control means for a lens port in accordance with the preferred embodiment of the invention.

Gear ring 16 is engaged with an apertured ring member 20 and gear ring 17 is engaged with a further ring 21. The engagement mechanism in each case will be described further hereinafter. The apertured ring member 20 has a number of apertures 25 therein, for example, three apertures 25.

Figure 3:
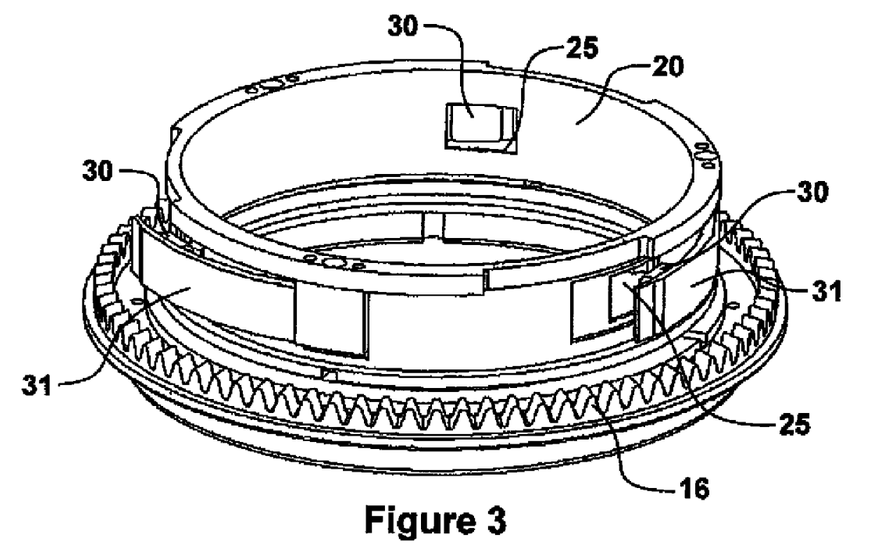
FIG. 3 is a perspective view of part of a lens port in accordance with the preferred embodiment of the invention including an apertured ring and biased pressure pads.
Figure 4:
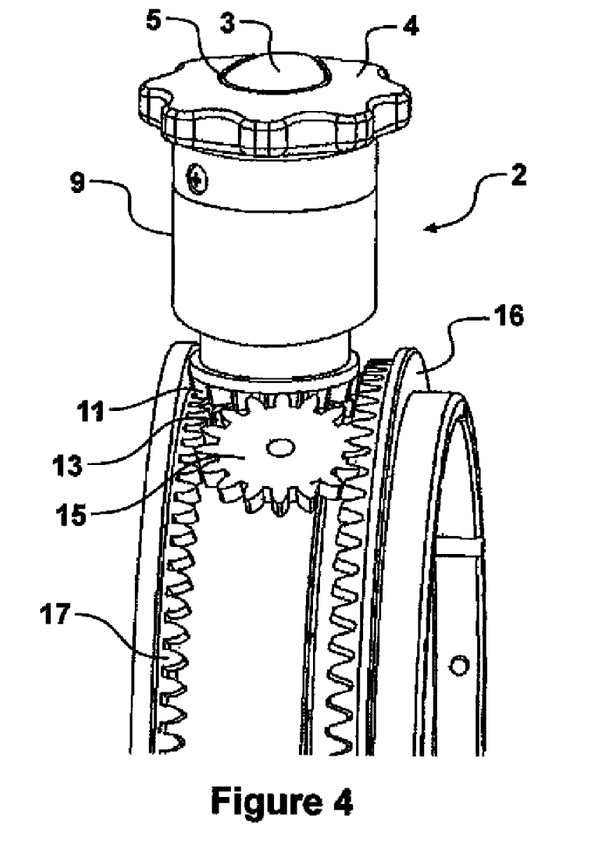
FIG. 4 is a perspective view of part of the control means of a lens port in accordance with the preferred embodiment of the invention.
Figure 5:
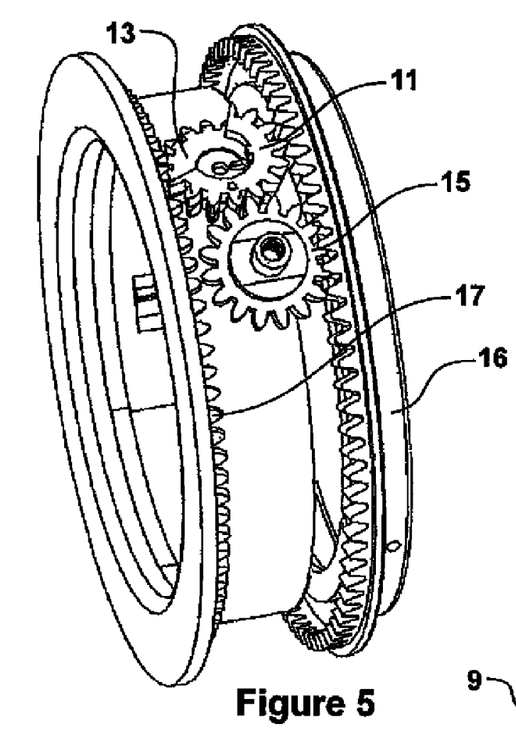
FIG. 5 is a perspective view of a further part of a control means forming part of a lens port in accordance with the preferred embodiment of the invention.
Figure 6:
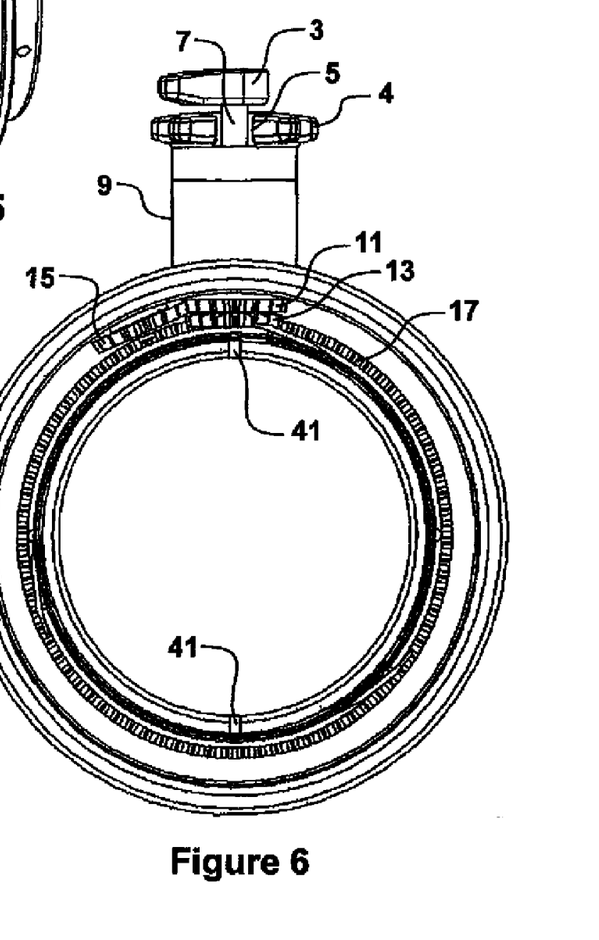
FIG. 6 is an end elevation of part of a control means forming part of a lens port in accordance with the preferred embodiment of the invention including the subject matter of FIG. 5.
Figure 7:
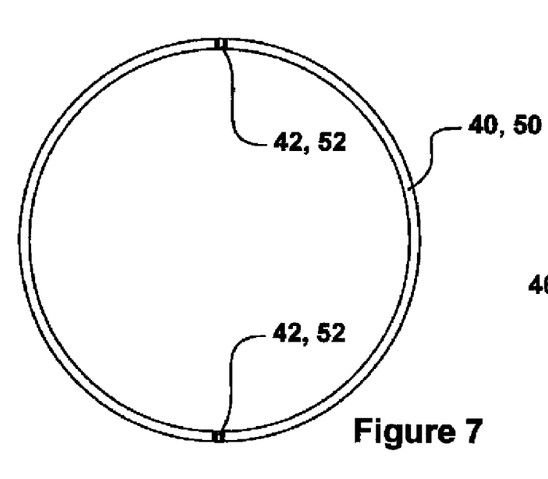
FIG. 7 is an end elevation of a floating ring forming part of a lens port in accordance with the preferred embodiment of the invention.
Figure 8:
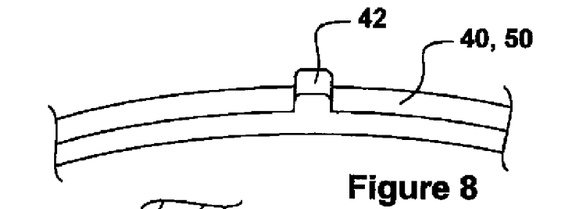
FIG. 8 is a perspective view of part of the subject matter of FIG. 7, FIGS. 9 to 11 are further views of the subject matter of FIG. 7.
Figure 9:
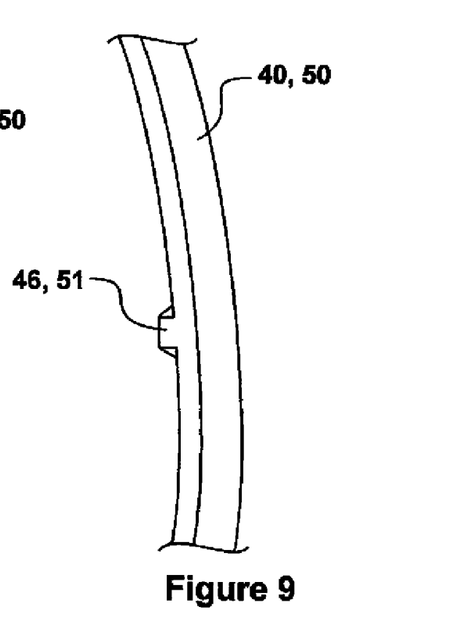
Figure 10:
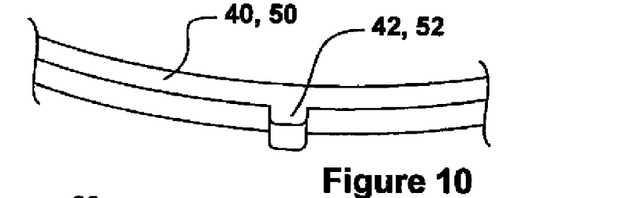
Figure 11:
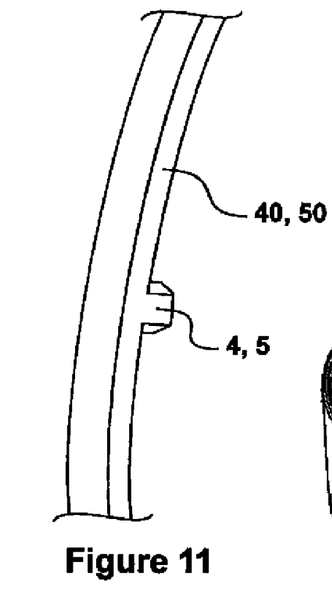
Figure 12:
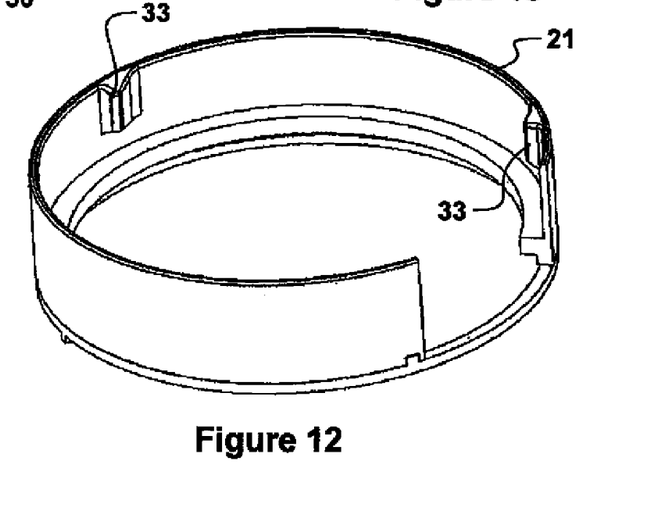
FIG. 12 is a partly cut away perspective view of the subject matter of FIG. 2.
Figure 13:
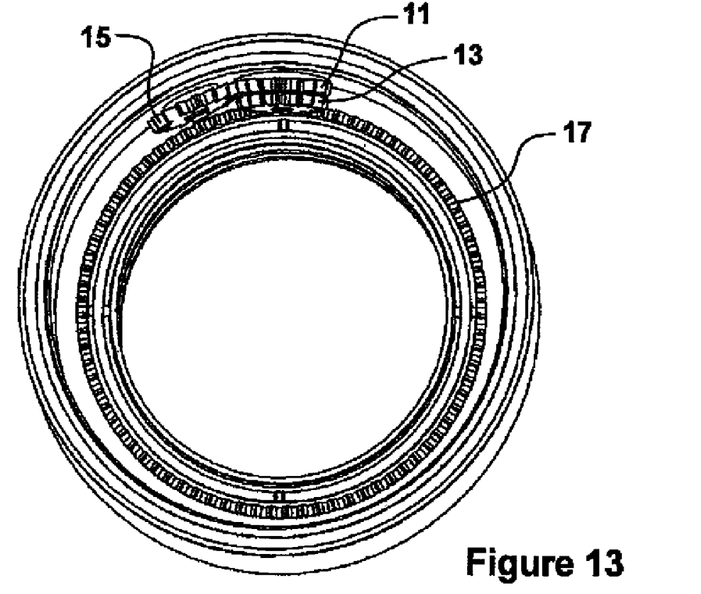
FIG. 13 is a perspective end view of a part of a lens port in accordance with the preferred embodiment of the invention.
Figure 14:
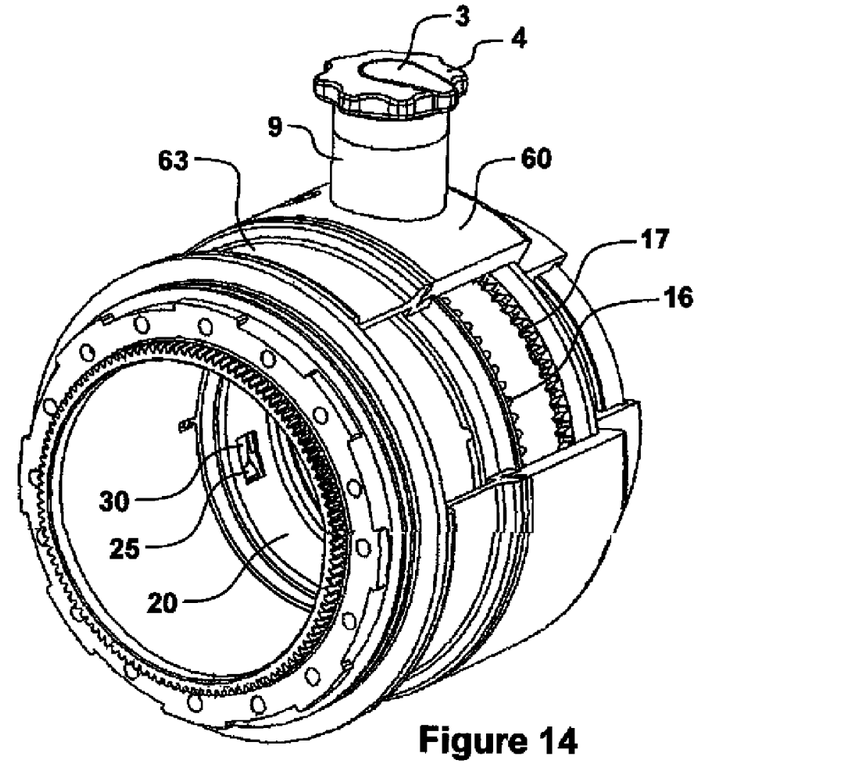
FIG. 14 is partly cut away perspective view of a lens port in accordance with the preferred embodiment of the invention.

Pads 30 are provided which are able to be pressed into and through the apertures 25. The pads 30 are biased out of the apertures 25, for example by leaf springs 31 on which the pads 30 are mounted. The leaf springs 31 are connected, for example to the apertured ring 20. Any suitable number of such leaf springs can be provided, for example, three as for the apertures 25, to give a satisfactory clamping action when in use. The further ring member 21 is positioned so that it overlies the leaf springs 31 and the pads 30. The inner surface of the further ring member 21 has inwardly extending protrusions 33 (see FIG. 2) thereon sized so that as the further ring member 21 is rotated by rotation of the knob part 3 the protrusions 33 will sweep over the outer surface of the leaf springs 31 moving the leaf springs towards the apertured ring member 20 and pushing the pads 30 into and at least partially through their corresponding apertures 25. Rotating knob part 3 in the other direction reverses the rotation of the further ring member 21 and allows the pads 30 to be withdrawn. The leaf springs 31 may be mounted to a further ring member 36 which carries a mounting lug 37 for each leaf spring. The further ring member 36 is mounted in use on the edge 38 of the apertured member 20.

When knob parts 3 and 4 rotate together there is no differential movement between gear rings 16 and 17 and therefore no differential movement between apertured member 20 and further ring member 21. Accordingly the pads 30 do not move relative to the apertures 25.

The connection between ring gear 17 and the further ring member 21 is through an intermediate ring member 40. The ring gear 17 has a pair of inwardly facing opposite slots 41 (FIG. 6) and the intermediate ring member 40 has a pair of protrusions 42 which are positioned in the slots 41. The connection is to some degree "floating". To achieve this the ring member 40 is dimensioned to allow some movement of the ring member 40 with respect to the ring gear 17 in the direction between the slots 41. The rear face 44 of the further ring member 21 also has slots similar to slots 41 which are engaged by protrusions 46 on the opposite side of ring member 40 from protrusions 42, which again allow some side to side movement of the further ring member 21 with respect to the ring member 40. The amount of such movement will depend on the dimensions of the ring member 40 and the relative dimensions of the slots 41 and protrusions 42.

Connection between the gear ring 16 and the apertured member 20 is made in similar fashion. An intermediate member 50 is provided with twin protrusions 51 and 52 on opposite sides of the ring member 50. The protrusions 51 and 52 engage in corresponding slots in the ring member 16 and apertured member 20, again with some movement allowed. Again the amount of movement will depend on the dimensions of the intermediate member 50, the protrusions 51 and 52 and the slots into which they engage.

When assembled the gear rings 16 and 17, the apertured member 20, the further ring member 21 and associated items are essentially held within a tubular member 60 which is provided with an aperture 61 through which the telescopic part 9 passes. The member 60 is able to be connected to another tubular member 63 which forms part of the port 1. Any further members necessary to allow the port 1 to be connected to the housing, such as members 67, 68 and 69 are provided. Also it will be apparent that any positions where water ingress could occur are sealed, for example, by the use of "O" rings or other sealing mechanisms. For example FIG. 15 shows "O" rings at 71, 72 and 73.

Figure 15:
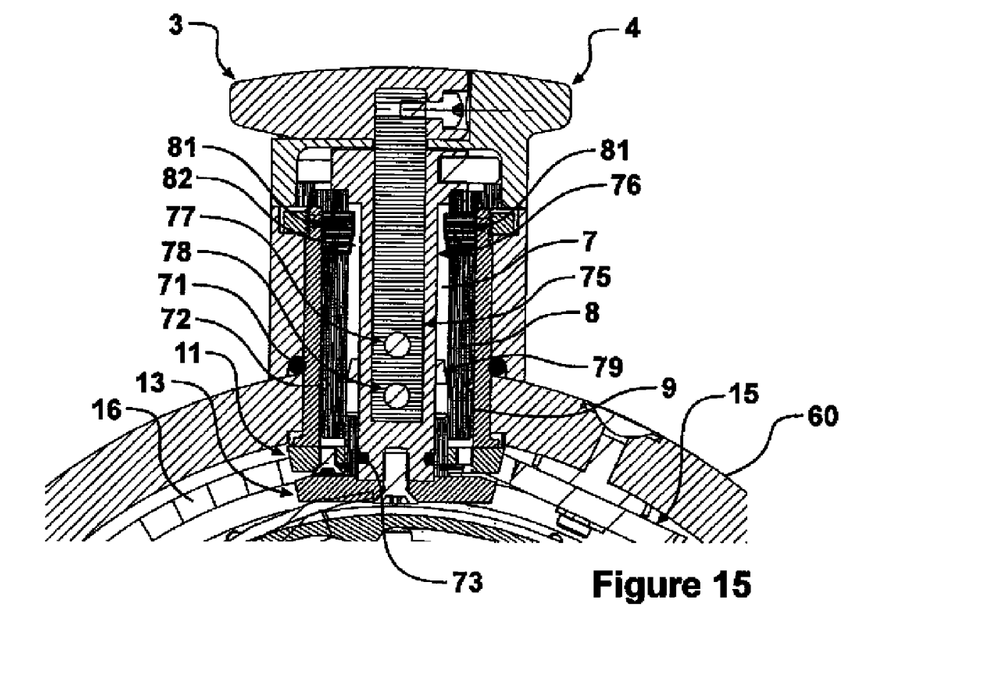
FIG. 15 is a cross-sectional view through part of a control member for use in the preferred form of the invention.
Figure 16:
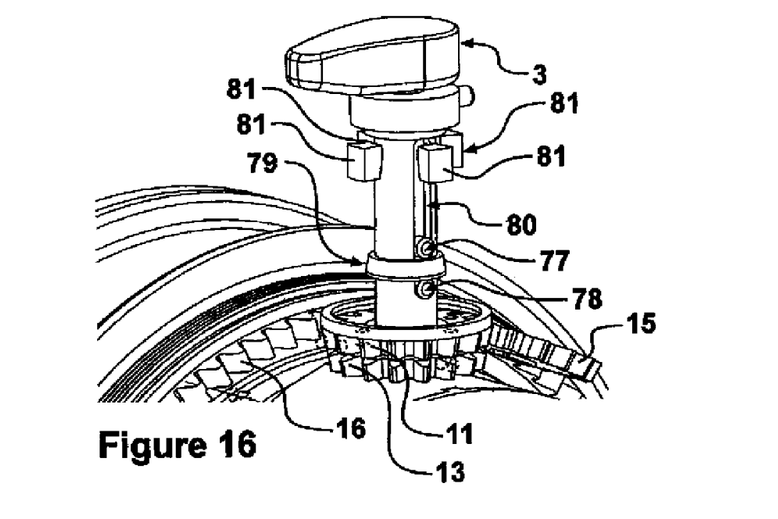
FIG. 16 is a showing the construction of FIG. 15 with an inner knob part in a retracted position.
Figures 17, 18:
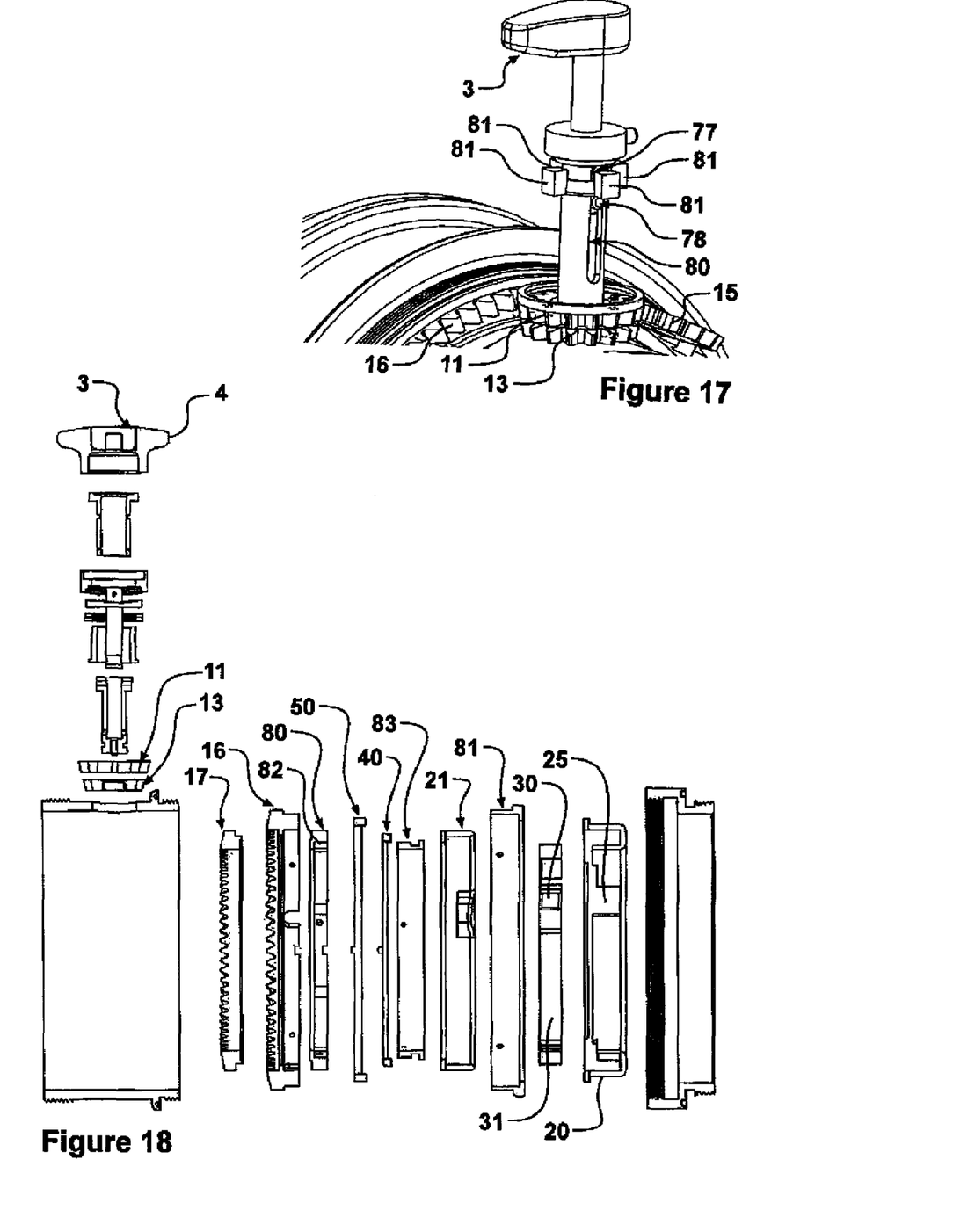
FIG. 17 is a view as in FIG. 16 with the inner knob part in an extended position.
FIG. 18 is a view as in FIG. 1 of an alternative embodiment of the invention.
Figure 19:
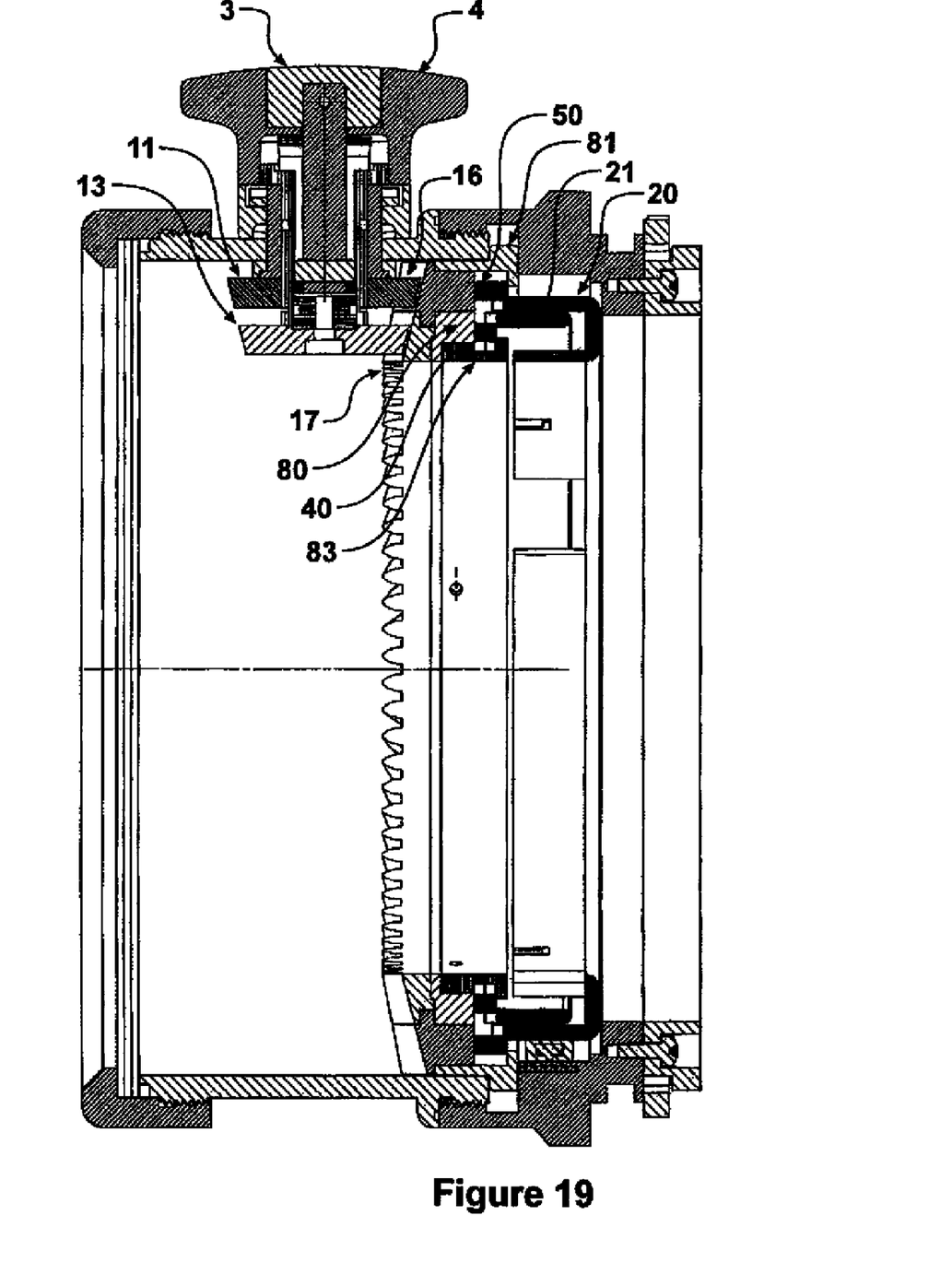
FIG. 19 is cross sectional view of the embodiment of FIG. 18, FIGS. 20 and 21 are perspective views of the embodiment of FIG. 18.
Figure 20:
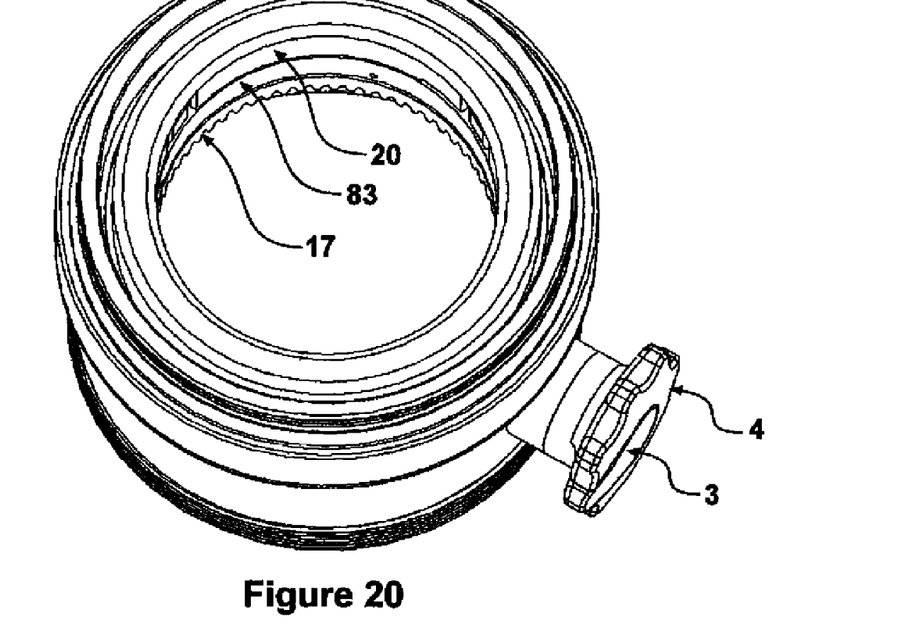
Figure 21:
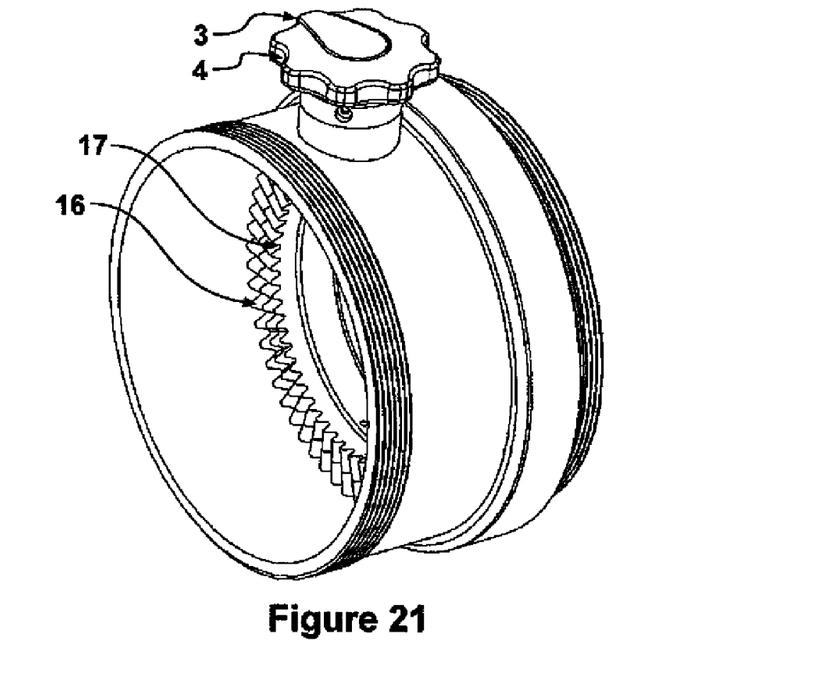
Figure 22:
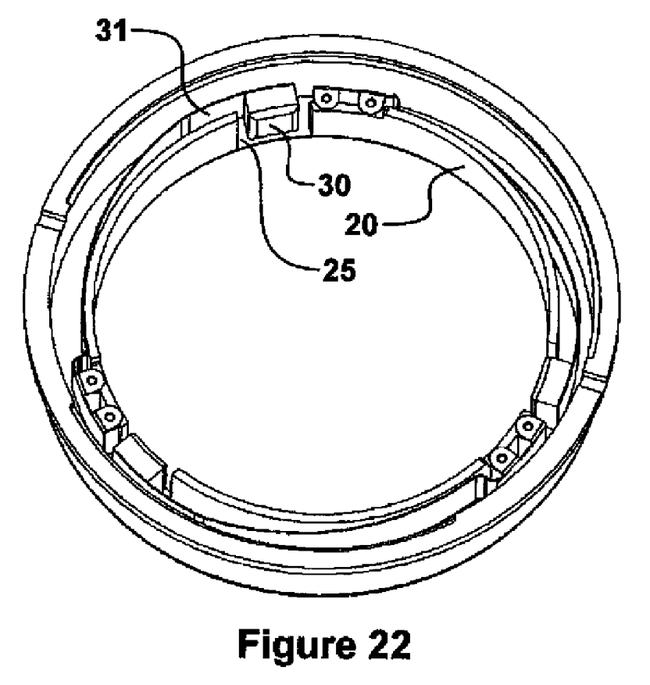
FIG. 22 is a perspective view of the clamping mechanism of the embodiment of FIG. 18.
Figure 23:
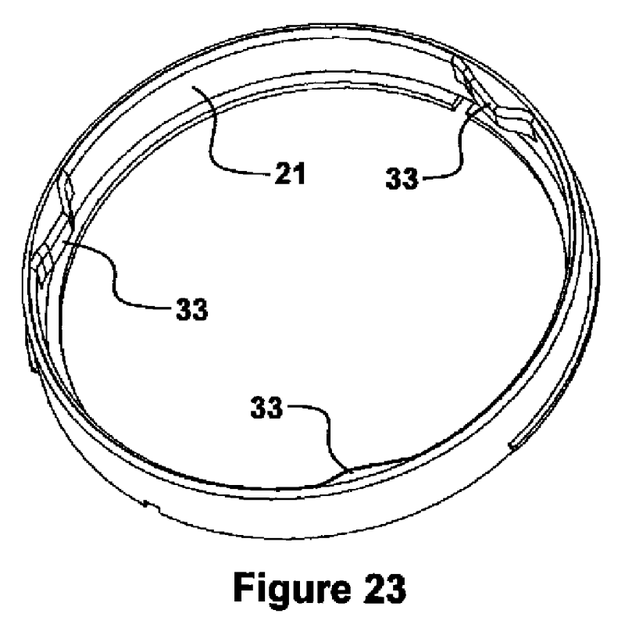
FIG. 23 is a perspective view of the ring member which applies pressure to the clamping mechanism of FIG. 22, and FIGS. 24 and 25 are perspective views of the embodiment of FIG. 18 in differing positions of use.
Figure 24:
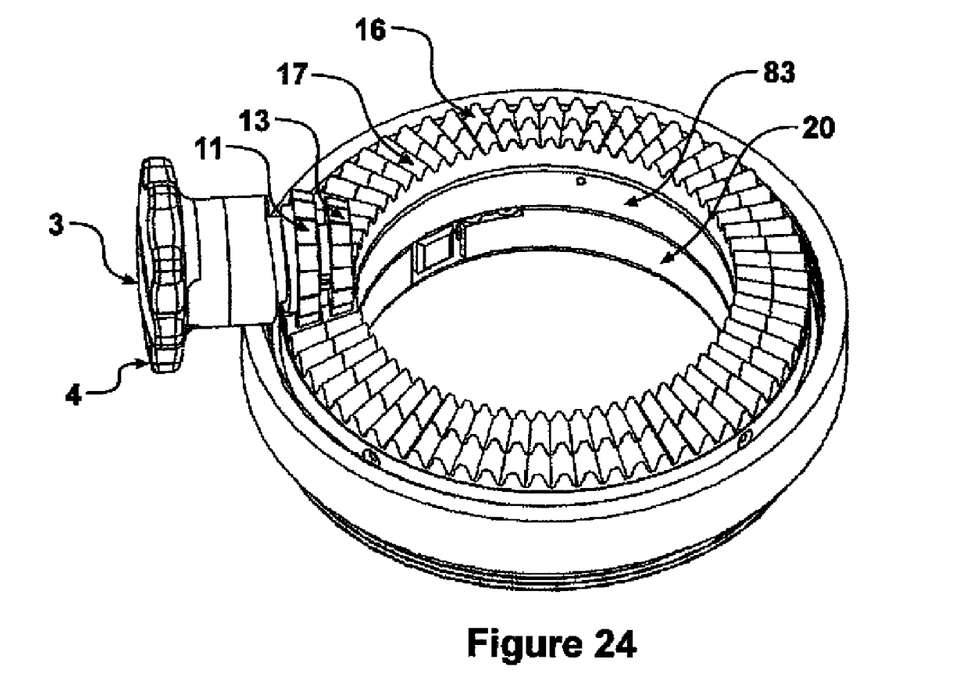

Turning now to FIGS. 15 to 17, inner part 7 is constructed of a shaft 75 connected to knob part 3 which slides telescopically in a tubular shaft 76. The shaft 75 carries a pair of pins 77 and 78 which capture between them a ring 79. The pins are movable in a longitudinal slot 80 in the wall of the tubular shaft 76. The ring 79 preferably tapers outwardly downwardly as can be seen in FIG. 16. The tubular member 9 has a number, such a four, pads 81. The pads 81 on their face which faces the tubular shaft 76 has a tapered face, e.g. face 82, which can be engaged in use by the tapered face of the ring 79. When the knob formed by knob parts 3 and 4 is in the position shown in FIG. 16 the parts 7 and 8 rotate together rotating cogs 11 and 13. When the knob part 3 is extended to the position shown in FIG. 17 the shaft 75, the pins 77 and 78 as well as the ring 79 are moved to the position shown in FIG. 17 where the ring 79 comes into contact with the pads 81. This frictional contact substantially prevents tubular shaft 8 from rotation and therefore cog 11 does not rotate. Cog 13 however will still rotate as knob part 3 is rotated by virtue of the connection between knob part 3, shaft 75, tubular shaft 76 and cog 13.

In use the lens of a camera is inserted into the port. This occurs from the right hand end of FIG. 1 and the left hand end of FIG. 14. The knob part 3 is then extended and rotated. This will rotate the ring 17 and therefore the further ring 21. This will cause the pads 30 to be moved into the apertures 25 where they will engage the zoom/focus ring of the camera lens. The knob part 3 is then nested in the knob part 4 and the knob is rotated as a whole. In this case there is no relative rotation between the further ring 21 and the apertured ring 20 so that the pads 30 remain clamped to the zoom/focus ring and the zoom/focus ring rotates to adjust the zoom and/or focus. The floating nature of the connections of rings 40 and 50 allow any small discrepancies of the alignment to be compensated for. By again extending the knob part 3 the reverse rotation can be effected to remove the pads 30 from the zoom/focus ring.

It will be apparent that more than one, such as two assemblies can be provided to engage separate zoom and focus rings.

Turning now to the embodiment of FIGS. 18 to 25. The construction is similar to the previous construction save that gear ring 17 now sits inside gear ring 16. Gear ring 16 is engaged by an intermediate member 50 as before and gear ring 17 engages intermediate member 40 through a further ring member 80. Leaf springs 31 carry pads 30 which are pushable into apertures 25 in apertured ring member 20.

A further apertured member 81 sits about the intermediate members 40 and 50 and the member 80 has an inward flange 82 to hold the intermediate member 50 in place. Intermediate member 40 has within a ring member 83.

Figure 25:
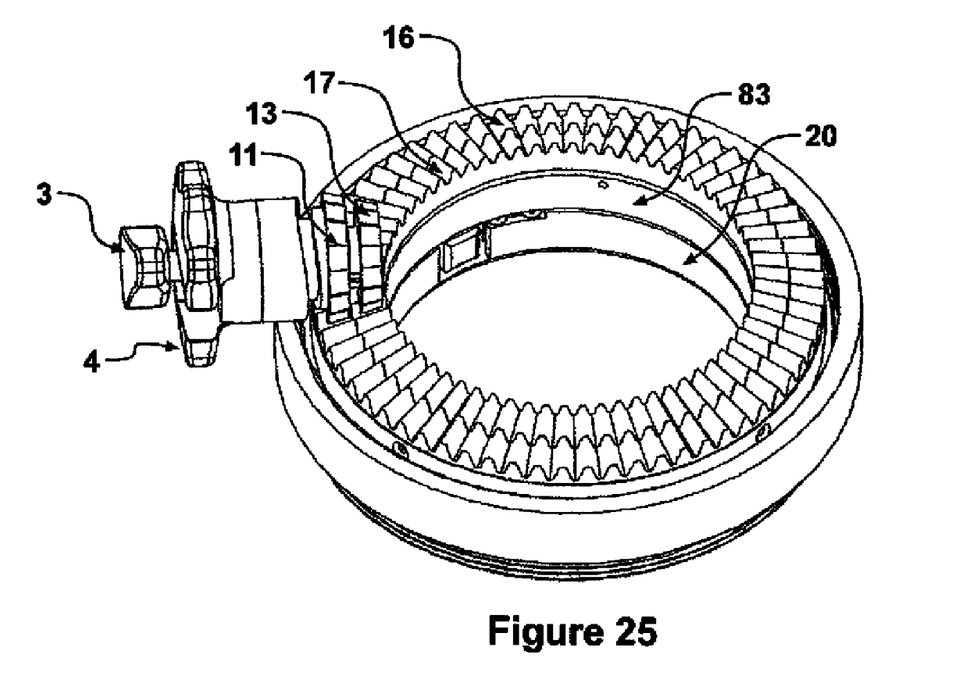

Again in use if knob part 3 is extended as shown in FIG. 25 only gear ring 17 rotates and the further ring 21 rotates to clamp the camera lens. When knob parts 3 and 4 are in the position shown in FIG. 24 the focus/zoom ring is able to be adjusted.

Advantages
a) The lens port of the invention can save time and effort of the user as no component need be attached to the lens before insertion into the port.
b) The lens can be clamped by simply pulling out a knob part and rotating it. Alignment of the lens in the port in a specific way is not required.
c) The knob part is easily re-inserted into the other knob part.
d) The invention does not add diameter to the port and therefore is comfortable to use.

Variations

Throughout the description of this specification, the word "comprise" and variations of that word such as "comprising" and "comprises", are not intended to exclude other additives, components, integers or steps.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

The invention claimed is:

1. A port for underwater photography attachable in use to a housing, the port having a control means operable externally of the port to engage and disengage a ring forming part of a lens positioned, in use, within the port, wherein the control means includes pads, the pads in use engage the lens ring, a first operation of the control means causing the pads to one of engage and disengage the lens ring and a second operation of the control means causing the pads to rotate the lens ring, wherein the control means further includes an apertured ring, biased arms mounted on an exterior of the ring, the arms having the pads thereon, the pads being extendable through the apertures to engage the lens ring, and a further ring about the arms, the further ring having means thereon to bear on the arms to push the pads through the apertures against the bias, the further ring being caused to rotate about the ring's longitudinal axis by the first operation of the control means.

2. The port as claimed in claim 1, wherein the control means includes a knob having a longitudinal axis, the longitudinal axis of the knob being positioned substantially normal to the longitudinal axis of the port.

3. The port as claimed in claim 1, wherein the apertured ring and the arms are caused to rotate about the longitudinal axis of the apertured ring by the second operation of the control means.

4. The port as claimed in claim 1, wherein in use a connection between the control means and the ring forming part of the lens is floating to allow some misalignment between the lens and the control means.

5. The port as claimed in claim 1, wherein the control means includes a knob, the knob includes a first knob part and a second knob part, the first knob part having a floating connection to a second ring, and the first knob part being operable to cause a first operation of the control means.

6. The port as claimed in claim 5, wherein the apertured ring has a floating connection to a gear ring, the second knob part being operable to cause a second operation of the control means.

7. The port as claimed in claim 5, wherein the second operation occurs when the first and second knob parts are operated together.

8. The port as claimed in claim 1, with a camera lens mounted at least partially therein.

9. A camera housing and a port in combination, the port being constructed according to claim 1.

10. The port as claimed in claim 2, wherein in use the connection between the control means and the ring forming part of the lens is floating to allow some misalignment between the lens and the control means.

11. The port as claimed in claim 3, wherein in use a connection between the control means and the ring forming part of the lens is floating to allow some misalignment between the lens and the control means.

12. The port as claimed in claim 2, wherein the knob includes a first knob part and a second knob part, the first knob part having a floating connection to the further ring, and the first knob part being operable to cause the first operation of the control means.

13. The port as claimed in claim 1, wherein the control means includes a knob, the knob includes a first knob part and a second knob part, the first knob part having a floating connection to the further ring, and the second knob part being operable to cause the first operation of the control means.

14. A port for underwater photography attachable in use to a housing, the port having a control means operable externally of the port to engage and disengage a lens ring forming part of a lens positioned, in use, within the port, the control means including an apertured ring, biased arms mounted on the exterior of the apertured ring, the arms having pads thereon, the pads being extendable through the apertures to engage the lens ring, and a further ring about the arms, the further ring having means thereon to bear against the arms to push the pads through the apertures against bias, the further ring being caused to rotate about its longitudinal axis by the first operation of the control means.

15. The port as claimed in claim 14, wherein the apertured ring and the arms are caused to rotate about the longitudinal axis of the apertured ring by the second operation of the control means.

16. A port for underwater photography attachable in use to a housing, the port having a control means operable externally of the port to engage and disengage a lens ring forming part of a lens positioned, in use, within the port, the control means including a knob having a longitudinal axis, the longitudinal axis of the knob being positioned substantially normal to the longitudinal axis of the port, the control means further including an apertured ring, biased arms mounted on the exterior of the apertured ring, the arms having pads thereon, the pads being extendable through the apertures to engage the lens ring, and a further ring about the arms, the further ring having means thereon to bear against the arms to push the pads through the apertures against bias, the further ring being caused to rotate about its longitudinal axis by the first operation of the control means.

* * * * *